United States Patent
Watanabe (10) Patent No.: US 10,351,479 B2
(45) Date of Patent: Jul. 16, 2019

(54) MAINTENANCE-FREE STONE TILE, COATING AGENT THEREFOR, AND METHOD FOR PRODUCING THE TILE

(71) Applicant: KYUSHU HIGHTEC CORPORATION, Kagoshima, Kagoshima (JP)

(72) Inventor: Masaki Watanabe, Kagoshima (JP)

(73) Assignee: KYUSHU HIGHTEC CORPORATION, Kagoshima (JP)

( * ) Notice: Subject to any disclaimer, the term of this patent is extended or adjusted under 35 U.S.C. 154(b) by 87 days.

(21) Appl. No.: 15/149,848

(22) Filed: May 9, 2016

(65) Prior Publication Data

US 2016/0332920 A1 Nov. 17, 2016

(30) Foreign Application Priority Data

May 11, 2015 (JP) ................................. 2015-107946

(51) Int. Cl.
*C04B 41/49* (2006.01)
*C09D 7/61* (2018.01)
(Continued)

(52) U.S. Cl.
CPC ........ *C04B 41/4988* (2013.01); *C04B 41/009* (2013.01); *C04B 41/5089* (2013.01);
(Continued)

(58) Field of Classification Search
None
See application file for complete search history.

(56) References Cited

U.S. PATENT DOCUMENTS 3,294,726 A * 12/1966 Wyner ..................... C09G 1/02
427/289
5,464,901 A * 11/1995 Yoshikawa ............. C08L 57/00
525/100
(Continued)

FOREIGN PATENT DOCUMENTS

JP    2010-0163584   *   7/2010   ............... C09D 1/00
JP    2010-163584    *   7/2010   ............... C09D 1/00
(Continued)

OTHER PUBLICATIONS

CSBslidingbearings.com. Surface Roughness Table. http://www.csbslidingbearings.com/surface-roughness-reference.html. Copyright Dec. 2014.*

*Primary Examiner* — David Sample
*Assistant Examiner* — Nicole T Gugliotta
(74) *Attorney, Agent, or Firm* — Birch, Stewart, Kolasch & Birch, LLP (57) ABSTRACT

A maintenance-free stone tile is provided in which a super hard coating film having a pencil hardness corresponding to 12H or more (preferably to 12 to 15H) is used to produce a finish having a deep material feeling and a high quality, and glossiness of 80 or more, and be further able of keeping the coating layer good in water resistance, antifouling property, slipperiness, adhesiveness and no crack, over a long term, on a surface of a stone tile, such as a marble, artificial stone, terrazzo or ceramic tile. The tile is a stone tile having an inorganic coating layer causing a surface of the stone to have a pencil hardness of 12H or more and a mirror surface glossiness of 80 or more.

3 Claims, 1 Drawing Sheet

(51) Int. Cl.
    *C04B 41/50*     (2006.01)
    *C09D 183/04*     (2006.01)
    *C08K 3/36*     (2006.01)
    *C04B 14/28*     (2006.01)
    *C04B 41/00*     (2006.01)
    *C04B 111/00*     (2006.01)

(52) U.S. Cl.
    CPC ............. *C09D 7/61* (2018.01); *C09D 183/04* (2013.01); *C04B 2111/00362* (2013.01); *C08K 3/36* (2013.01)

(56) References Cited

U.S. PATENT DOCUMENTS

| | | | | |
|---|---|---|---|---|
| 5,895,713 | A * | 4/1999 | Miyazaki | ............... C03C 17/009 106/287.1 |
| 6,846,567 | B1 * | 1/2005 | Ekinaka | ................... C08J 7/042 428/39 |
| 6,896,958 | B1 * | 5/2005 | Cayton | ................ C09D 183/04 252/363.5 |

FOREIGN PATENT DOCUMENTS

JP             4957926 B2     6/2012
WO    WO 2014/129081 A1     8/2014

* cited by examiner

MAINTENANCE-FREE STONE TILE, COATING AGENT THEREFOR, AND METHOD FOR PRODUCING THE TILE

This non-provisional application claims the benefit under 35 U.S.C. § 119(a) to Patent Application No. 2015-107946 filed in Japan on May 11, 2015, all of which are hereby expressly incorporated by reference into the present application.

BACKGROUND

1. Field of the Invention

The present invention relates to a maintenance-free stone tile in which an inorganic glassy coating layer excellent in high hardness and high mirror surface glossiness is formed on a surface of a stone that may be of various type, such as marble or granite, and any subsequent maintenance is not required; a coating agent therefor; and a method for producing the tile.

2. Description of the Related Art

Conventionally, the maintenance of floors of various stone, such as marble, an artificial stone and terrazzo, is generally done by a wax method or grinding with a diamond grindstone. The wax method has many problems from the viewpoint of quality, glossiness-maintaining performance etc., and has other problems, one thereof being a problem that it is indispensable to make a work of peeling the wax periodically and further a beautiful appearance of the floors is remarkably damaged by darkening and stains if the work is left undone. It is therefore difficult to keep the floors in a high quality state over a long term. Furthermore, a wax-peeling agent itself is strongly alkaline to decrease the glossiness of the stone and make the stone themselves brittle. Thus, the maintenance based on this method is a method not recommendable very much. In the meantime, according to the grinding with a diamond grindstone, a grinding work having about 5 to 7 steps is necessary for mirror-finishing the floors so that much labor is required to maintain and control the floors. Moreover, even when marble is ground with much labor, marble is decreased in glossiness after several months since marble itself is a soft stone. Accordingly, unless the stone is periodically ground, the material is not easily kept in a high quality state over a long term. Furthermore, water used for the grinding makes the stone itself brittle. Thus, the method is not very desirable for stones. In recent years, in order to solve these problems, various coating agents for stone have been proposed. However, even when these coating agents are adopted, there remain problems as described below.

(1) Damage in Mirror Surface Glossiness:

When a silicone-based coating agent, or a resin-based coating agent that may be of various types is applied to surface of marble, the surface generally gains a high glossiness but is damaged in mirror surface degree not to gain a high-quality finish. The reason why the mirror surface degree is damaged is generation of air bubbles, application unevenness or coating streaks on the application. Additionally, the stone itself absorbs the agent to damage the mirror surface degree to give a finish poorer in appearance than mirror surface finish obtained by grinding with a diamond grindstone.

(2) Unstable Adhesiveness:

A main component of marble, artificial stones, terrazzo and others is calcium carbonate. Thus, such stones are basically bad in adhesiveness to hard coating agents so that after the application of the agents, a poor adhesion of the agents may generate vertical injuries, peels or others. Moreover, the resultant coating film shrinks by condensation reaction to be easily, for example, cracked or peeled. Thus, the stones are remarkably damaged in quality.

(3) Difficult Maintenance:

Even when a coating film can be formed, the film may be, for example, injured, peeled or cracked with time for the above-mentioned reasons. Thus, even the stone is re-coated, resulting in an uneven finish. Later repair often becomes difficult. Resin coating agents also become conspicuously darkened with time, so that in the same manner the stone turns into a state of not being easily repaired. In short, the existing covering-type coating agents have a problem of being gradually deteriorated in quality with the passage of time.

(4) High Slipperiness:

When a silicone-based or resin-based coating agent is applied, the slipperiness of the resultant floor surface generally becomes a problem in both a dry state (the floor surface is dry) and a wet state (the floor surface is wet) to increase a risk of a falling accident or other accidents. Silicone-based coating agents are generally high in water repellency to give a very high slipperiness in a wet state. In the meantime, resin-based coating agents are increased in slippage, which follows deterioration in the glossiness of the agents (surface roughness). Thus, whether floor surface is in a dry state or in a wet state, a falling accident or other accidents are easily caused.

Since there remain problems as described above, at present the maintenance of various stone in various commercial facilities, hotels, public facilities, play or game facilities, and others inside and outside Japan is generally a maintenance method using grinding, or maintenance using a wax method. Thus, maintenance-free stone tiles have not been provided.

An invention disclosed in Patent Literature 1 (Japanese Patent No. 4957926 (JP 2010-163584 A)) proposed previously is about a maintenance method for a vinyl chloride floor, using an inorganic coating layer. This Patent Literature 1 discloses "a flexibility-given and ambient-temperature-hardenable inorganic coating agent for protecting a chemical floor, in which at least a mixture of tetrafunctional and trifunctional alkoxysilanes, the proportion of the mixture being from 10 to 45% by weight of a composition of the whole of the coating agent, is mixed with colloidal silica superfine particles having an average particle size of 5 to 20 nm, the proportion of the particles being from 10 to 50% by weight of the composition; and further the following are blended into the composition to give flexibility to a coating layer for a soft vinyl chloride floor: a silicone alkoxy oligomer and/or a bifunctional alkoxysilane, the proportion of the component(s) being from 2 to 20% by weight of the composition; a silane coupling agent in which one or more functional groups of a vinyl group, an epoxy group and/or an amino group is/are used, as a binder for the colloidal silica superfine particles and the alkoxysilanes, the proportion of the agent being from 0.5 to 2.0% by weight of the composition; and, e.g., a phosphoric acid based catalyst and/or a titanium based catalyst, as one or more catalyst(s) for promoting a condensation reaction of silanols produced by the hydrolysis of the alkoxysilanes, the proportion of the catalyst(s) being from 0.5 to 5% by weight of the composition.

However, according to Patent Literature 1, in order that a coating agent can be caused to follow a soft and flexible chemical floor material such as vinyl chloride, and a layer of the agent can maintain a high-hardness top coating layer, it was necessary to introduce the silicone alkoxy oligomer and/or the bifunctional alkoxysilane for giving flexibility. However, in the present invention, a floor material itself is a hard stone; thus, the invention is characterized in that it is unnecessary to give flexibility as attained by a coating agent for chemical floors, consider recoating, and use an underlying material for heightening the coating agent of the present invention in adhesiveness to the substrate.

According to a vinyl chloride based tile subjected to a laminated-type inorganic protective coating processing, and a coating method therefor in WO/2014/129081, a laminated-type coating layer is formed on the surface of a vinyl chloride based tile, thereby making it possible to form a maintenance-free coating layer having a hardness corresponding to a pencil hardness of 10H or more, desirably 12H or more even when this tile is a soft vinyl chloride based tile. However, a coating agent for stone does not need to be made into a laminated-type coating layer for the purpose of stress relaxation since floor materials themselves of stones are very hard. A super hard top coating monolayer finish can produce a maintenance-free state.

SUMMARY

In order to solve the above-mentioned problems, an object of the present invention is to provide a newly developed maintenance-free stone tile of, for example, marble, an artificial stone or terrazzo, a coating agent therefor, and a method for producing the tile. Specifically, in this invention, a maintenance-free coating film having a surface roughness Rmax of 0.8 s ($\mu$m) or less (hereinafter merely referred to as "s" for the unit of surface roughness Rmax) and a mirror surface glossiness of 80 or more is formed by forming a super hard glassy coating agent onto marble, artificial stones, terrazzo, and other various stones on which a film of such an agent has not been hitherto easily formed, and then subjecting the resultant to a post processing of grinding the coating film with a diamond grindstone. Technical points therefor are roughly classified to three. A first point of the three is that in order that the coating film can have a maintenance-free glossiness-maintaining performance and can be ground, it is necessary to form the coating film with a high hardness corresponding to at lowest 12H or more. A second point is that the coating layer needs to be a coating layer having such a hardness and an adhesiveness that the coating layer can resist against a shear load generated when the outer surface of the coating agent is ground with a diamond grindstone. Marble and other stones are generally made mainly of calcium carbonate; thus, the materials are not very good in adhesiveness to various coating agents. The coating agent is required to have such a high adhesiveness that the agent can resist against being ground. A third point of the three is that in order to make post processing (diamond grindstone grinding) possible at a time from about one hour to one day after the application of the coating agent, the hardening of the coating agent after the application of the agent needs to rise up promptly. The coating agent needs to be a coating agent rich in the so-called reaction hardenability. Any agent other than inorganic glassy coating agents satisfying the three points makes it difficult to form a maintenance-free coating film excellent in mirror surface glossiness on the surface of marble etc. in a short period. If the three can be attained, even a relatively soft stone, such as marble, can be modified to a material equivalent in hardness to, for example, ceramic tiles or granite. In other words, if a coating layer is equivalent in hardness to, for example, glass, quartz or ceramic tiles, a material covered with this layer can be changed to a maintenance-free material excellent in glossiness-maintaining performance over a long term.

The present application provides a maintenance-free stone tile, comprising a stone tile and an inorganic glassy protective coating layer formed on a surface of the stone tile, wherein the layer has an outer surface having a pencil hardness of a value corresponding to 12H or more in the case of measuring the outer surface on the basis of correlative data between a pencil hardness test and an abrasion resistance test; a thickness of the coating of 20 to 50 $\mu$m; a surface roughness Rmax of 0.8 s or less; a mirror surface glossiness of 80 or more; dry slip properties of 0.6 or more; a wet slipperiness of 0.5 or more; and a surface resistance value of $10^{11}\Omega$ or less; a coating agent therefor; and a method for producing the tile.

DETAILED DESCRIPTION OF EMBODIMENTS

The first aspect of the present invention relates to a maintenance-free stone tile, comprising a stone tile and an inorganic glassy protective coating layer formed on a surface of the stone tile,
wherein the layer has an outer surface having a pencil hardness of a value corresponding to 12H or more in the case of measuring the outer surface on the basis of correlative data between a pencil hardness test and an abrasion resistance test; a thickness of the coating of 20 to 50 $\mu$m; a surface roughness Rmax of 0.8 s or less; a mirror surface glossiness of 80 or more; dry slip properties of 0.6 or more; a wet slipperiness of 0.5 or more; and a surface resistance value of $10^{11}\Omega$ or less.

According to this aspect, a super hard glassy coating film having a pencil hardness corresponding to 12H or more, preferably a value of 12 to 15H is formed on a surface of a stone tile such as a marble, artificial stone, terrazzo or ceramic tile. After about one hour to one day, the resultant stone tile is then subjected to a post processing of grinding with a diamond grindstone. In this way, a stone tile is produced which can be finished to have a surface roughness Rmax of 0.8 s or less and a mirror surface glossiness of 80 or more. This technique makes it possible to provide a maintenance-free stone tile having a very good glossiness-maintaining performance that is about 10 to 20 times compared to the case of general grinding. Furthermore, this technique makes it possible to provide a maintenance-free stone tile that can gain a coating film which can be improved in slipperiness to avoid the risk of a falling accident etc., which is good in water resistance, antifouling property, adhesiveness and electrostatic property, and which does not generate cracks.

The second aspect of the present invention relates to an inorganic glassy coating agent for a maintenance-free stone tile, comprising a main ingredient which comprises:

a polyorganosiloxane comprising at least one kind of an alkoxysilane or a mixture of at least two kinds of a tetrafunctional alkoxysilane and a trifunctional alkoxysilane, a silane coupling agent that has an epoxy functional group; and colloidal silica superfine particles having an average particle size of 5 to 20 $\mu$m;

wherein provided that the proportion of the main ingredient being regarded as 100% by weight, the polyorganosiloxane is from 30 to 50% by weight; the proportion of the main ingredient being regarded as 100%, the silane coupling agent is from 5 to 20% by weight;

the colloidal silica superfine particles are from 20 to 40% by weight; of the main ingredient; and phosphoric acid and/or such a substance is in the range from 0.1 to 5.0% by weight or a titanium based catalyst and/or an aluminum based catalyst is in the range from 0.1 to 20.0% by weight, added as a catalyst for heightening reaction hardenability.

In this aspect, in order to yield a super hard inorganic glassy coating agent having a hardness corresponding to 12H or more, a material design specification is firstly prepared which makes use of a tetrafunctional silane and a trifunctional silane, an epoxy functional group silane coupling agent, and a silica sol having an average particle size of 5 to 20 nm. In order for this material to produce the hardness corresponding to 12H or more in a period from one hour to one day, a catalyst is reconsidered to decide to use phosphoric acid, or a titanium based catalyst and/or an aluminum catalyst, the acid or the catalysts being high in reaction hardening performance, and further decide to select a silane suitable for the catalyst(s) to attain a rise-up of the hardening up to a hardness corresponding to 12H or more in a short period. Lastly, in order to solve the instability of the adhesiveness of the coating layer, the specification is modified to a specification containing a silane coupling agent having an epoxy functional group relatively good in affinity with calcium carbonate which is a component of stone. Furthermore, about the silanes having the above-mentioned composition, silanes smaller in molecular weight than the silane coupling agent are used to heighten the coating agent in permeability into stones, and to create a state that the coating layer is caused to adhere closely to the stone by anchor effect. In other words, the chemical bonding through an epoxy functional group silane coupling agent and the use of silanes small in molecular weight make the coating agent high in permeability into stone and in anchor effect (physical adhesion). The thus-obtained double adhesion makes the agent into a state closely adhesive to marble. As a result, in about one hour to one day after the application of the agent, a highly hard coating film is obtained with a value corresponding to 12H, so that grinding processing with a diamond grindstone as a post processing can be attained. Thus, a finish is obtained which has a surface roughness Rmax of 0.8 s or less and a mirror surface glossiness of 80 or more. In this way, a maintenance-free stone tile is obtainable which has a very good glossiness-maintaining performance that is 10 to 20 times compared to that obtained by general grinding, which can gain mirror surface glossiness, deep material feeling, antifouling property, waterproofness, abrasion resistance, transparency, water resistance, acid resistance, alkali resistance, oil resistance and others, which can be prevented from being cracked or damaged in any other manner, and which can keep glossiness over a long term. It is generally mentioned about slip resistance coefficient values that CSR values of 0.4 or less are in a risky range. However, by making a finish having a high mirror surface degree as described above, by adding to the agent the colloidal silica in a proportion of 20 to 40% by weight, by using the silane coupling agent of a relatively weakly water-repellent epoxy functional group, and by other technical means, a super hard coating film can be formed on stone tile floor, the film being a film in which slip properties of 0.6 or more in a dry state and 0.5 or more in a wet state can be attained, these values being according to CSR value measurement, and the slipperiness is largely improved to restrain the generation of a falling accident and other accidents. Different points of the present invention from the precedent U.S. Pat. No. 4,957,926, are as follows: in the precedent patent, a purpose of using a silane coupling agent was to bond alkoxysilane and the colloidal silica chemically to each other. In the present invention, a purpose of using the silane coupling agent is that the agent itself heightens adhesiveness of the coating agent to marble. In order to prepare a highly hard coating agent, it is necessary to form a uniform coating film in which internal strain is as small as possible. For example, if only a surface portion of a coating film is excessively promoted in hardness, internal strain is generated so that the coating film may be cracked. Thus, the addition of the silane coupling agent relatively slow in reaction rate makes it possible to form an even coating film in which internal strain is not easily generated.

The third aspect of the present invention relates to a method for producing a maintenance-free stone tile, comprising:

a step of adjusting a viscosity of a glassy coating agent for a stone tile to 3 cSt to 6 cSt (mm$^2$/s), and then coating a floor surface of a stone that is obtained by roughening a surface of the stone beforehand by diamond grinding, a step of hardening the coating agent at ambient temperature in one hour to one day after the coating treatment to have a pencil hardness corresponding to 12H or more when the pencil hardness is measured on the basis of correlative data between a pencil hardness test and an abrasion resistance test; and a subsequent step of grinding the outer surface of the resultant coating layer with a diamond grindstone, whereby the resultant outer surface has a surface roughness Rmax of 0.8 s or less and a mirror surface glossiness of 80 or more, wherein the glassy coating agent for a stone tile comprises a main ingredient which comprises:

a polyorganosiloxane comprising at least one kind of an alkoxysilane or a mixture of at least two kinds of a tetrafunctional alkoxysilane and a trifunctional alkoxysilane, a silane coupling agent that has an epoxy functional group; and colloidal silica superfine particles having an average particle size of 5 to 20 μm;

wherein provided that the proportion of the main ingredient being regarded as 100% by weight, the polyorganosiloxane is from 30 to 50% by weight;

the silane coupling agent is from 5 to 20% by weight;

the colloidal silica superfine particles are from 20 to 40% by weight; and phosphoric acid is in the range from 0.1 to 5.0% by weight or a titanium based catalyst and/or an aluminum based catalyst is in the range from 0.1 to 20.0% by weight, added as a catalyst for heightening reaction hardenability In order to set the viscosity into the range of 3 to 6 cSt (mm$^2$/s), the selected silanes are silanes relatively small in molecular weight, or the addition amount of the water-dispersed colloidal silica, which affects the viscosity, is adjusted to make the viscosity low.

In this aspect, the surface of a stone is beforehand roughened by diamond grinding, thereby heightening the coating agent in permeability into the stone so that a highly adhesive coating film can be formed. Since the viscosity of the coating agent is adjusted into the range of 3 to 6 cSt (mm$^2$/s), the agent can be improved in fluidity. Improvement of levelling property after application makes it possible to form a coating layer having a mirror surface degree that is, to some degree, high even when no post processing is conducted. Permeation of the coating agent into the inside of marble having relatively low water absorption coefficient can provide high adhesiveness to the stone itself. Furthermore, the coating film surface of the above-mentioned composition can be ground after about one hour to one day passed after coating to have a surface roughness Rmax of 0.8 s or less and a mirror surface glossiness of 80 or more, resulting in modification to a mirror surface state. The above matters make it possible to provide a maintenance-free stone tile which is excellent in mirror surface glossiness, which can keep glossiness-maintaining performance about 10 to 20 times excellent compared to ordinary stone surfaces, and which can maintain high hardness, deep material feeling, antifouling property, waterproofness, abrasion resistance, transparency, cracking resistance, and slip resistance over a very long term.

In the present invention, such a stone as marble, granite, an artificial stone, terrazzo or a ceramic tile etc. can be applied to floor material.

Main examples of the tetrafunctional alkoxysilanes and the trifunctional alkoxysilanes used in the present invention include tetramethoxysilane, methyltrimethoxysilane, phenyltrimethoxysilane, tetraethoxysilane, methyltriethoxysilane, phenyltriethoxysilane, hexyltrimethoxysilane, hexyltriethoxysilane, decyltrimethoxysilane, decyltrimethoxysilane, and trifluoropropyltrimethoxysilane; and methyl silicate, and ethyl silicate.

Examples of the silane coupling agent used include β-(3, 4epoxycyclohexyl)ethyltrimethoxysilane, γ-glycidoxypropyltrimethoxysilane, γ-glycidoxypropylmethyldiethoxysilane, and γ-glycidoxypropyltriethoxysilane as epoxy functional group silane coupling agents.

Examples of the colloidal silica used to cause the coating agent to have a high hardness include organic-solvent-dispersed silica, dispersed in, for example, methanol, ethanol, isopropanol, methyl ethyl ketone, methyl ethyl, and methyl isobutyl. A water-dispersed silica is also used. Each of the used silicas has a particle size of 5 to 20 nm.

The used catalyst(s) is/are, for example, a phosphoric acid based catalyst, or a titanium based catalyst (organotitanate) and/or an aluminum based catalyst. The used phosphoric acid based catalyst is a catalyst in which phosphoric acid is diluted with an alcohol (isopropyl alcohol) to have a solid content of 20 to 30%, or a catalyst in which phosphoric acid is diluted with water to have a solid content of about 60 to 80%. The used titanium based catalyst is, for example, an organotitanate, and is mainly a catalyst in which, for example, the following is diluted with, for example, an alcohol to have a concentration of about 50%: tetra-i-propoxytitanium, tetra-n-butoxytitanium, tetrakis(2-ethylhexyloxy)titanium, tetrastearyloxytitanium, di-i-propoxy•bis(acetylacetonato)titanium, di-n-butoxy•bis(triethanolaminato)titanium, titanium-i-propoxyoctyleneglycolate, or titanium stearate. Each of them is added to give a proportion of 0.1 to 5.0% by weight.

Examples of the aluminum based catalyst include aluminum alcolates, and aluminum chelates, and cyclic aluminum oligomers. More specific examples of the aluminum alcolates include aluminum isopropylate, mono sec-butoxyaluminum diisopropylate, aluminum sec-butyrate, and aluminum ethylate. Examples of the aluminum chelates include aluminum ethylacetoacetate diisopropylate, aluminum tris (ethylacetoacetate), aluminum alkylacetoacetate diisopropylate, aluminum monoacetylacetonate bis(ethylacetoacetate), and aluminum tris(acetylacetonate). Examples of the cyclic aluminum oligomers include cyclic aluminum oxide isopropylate, cyclic aluminum oxide stearate, cyclic aluminum oxide octylate, and cyclic aluminum oxide stearate. About each of these catalysts, usable is a dilution in which the catalyst is appropriately diluted with an organic solvent, such as an alcohol or xylene. Each of the aluminum catalysts is added to give a proportion of 1 to 20% by weight.

Table 1 shows physical properties of species of marble, which is in general frequently used. As demonstrated by these physical properties, it is understood that the water absorption coefficient of marble is very low value of 0.17% or less.

TABLE 1

|  | Specific gravity | Compressive strength (N/mm2) | Bending strength (N/mm2) | Water absorption coefficient (%) |
| --- | --- | --- | --- | --- |
| Bianoco carrara (marble) | 2.68 | 82.2 | 18.2 | 0.10 |
| Botticino (marble) | 2.70 | 87.2 | 12.4 | 0.09 |
| Perlino rosato (marble) | 2.65 | 57.8 | 12.3 | 0.17 |
| Rosso magnaboschi (marble) | 2.70 | 126.4 | 14.2 | 0.13 |
| Limestone | 2.31 | 48.3 | 6.9 | 6.55 |
| Granite | 2.65 | — | — | 2.62 |
| Cement terrazzo | 2.20 | 49.9 | 7.5 | 5.97 |

Figure 1:
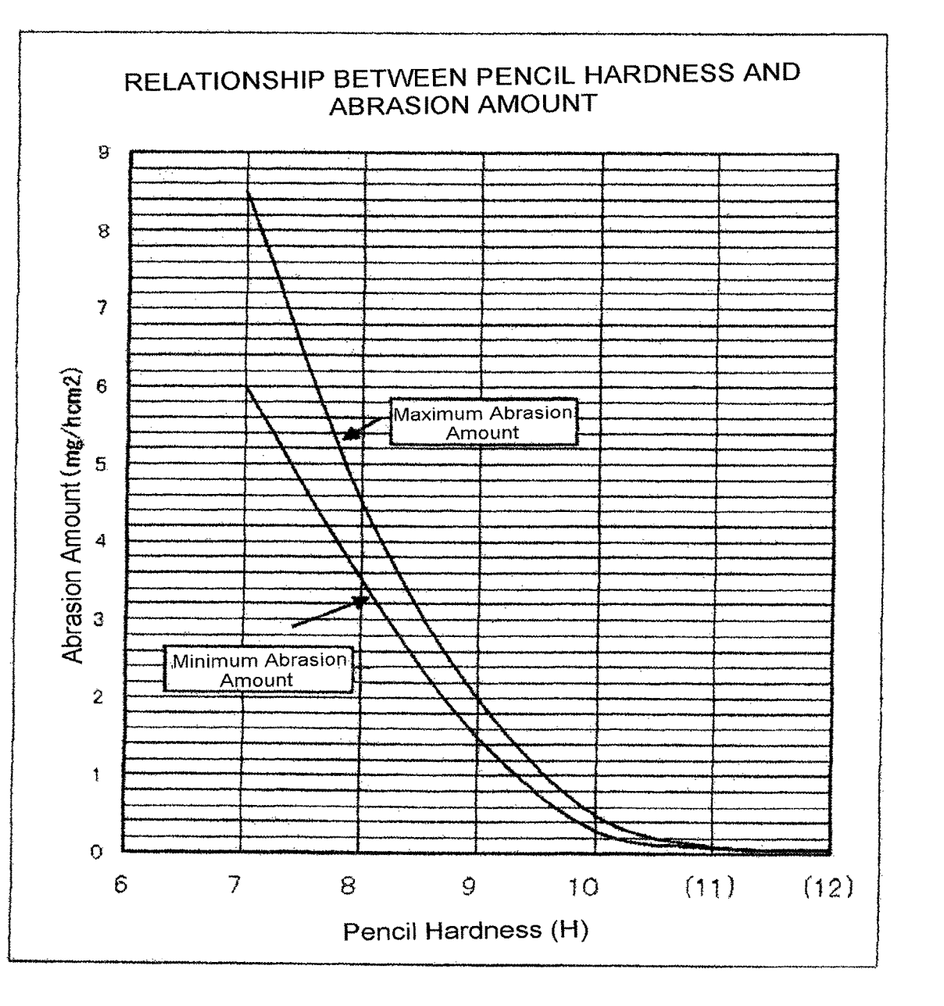
FIG. 1 shows correlative data between a pencil hardness test and an abrasion respective test.

A first physical property required for the present coating agent is that at a time from about one hour to one day after the agent is applied, the resultant coating film gains a hardness corresponding to 12H or more. In other words, when the hardness is a value corresponding to 12H or more, it has been verified that the film is not peeled by grinding. By adjusting the hardness to a value corresponding to 12H or more, this coating film comes to have a high hardness and a high adhesiveness (if the adhesiveness is poor, even the highly hard coating film shows a low pencil hardness value). Moreover, when the hardness is the value corresponding to 12H or more, the coated marble can keep glossiness about 10 to 20 times highly excellent compared to the marble obtained by grinding. About the evaluation of the pencil hardness, a value of 11H or more is shown as a relative value obtained by measuring a surface to be tested on the basis of correlative data between a pencil hardness test and an abrasion resistance test, as shown in FIG. 1.

A second physical property required for the coating agent is that the outer surface of the agent can be ground. When the glassy coating agent is applied and hardened and subsequently the resultant film is diamond-ground to give a surface roughness Rmax of 0.8 s or less and a mirror surface glossiness of 80 or more, a high-quality finish can be obtained which is equivalent in quality to a finish obtained by an ordinary stone-grinding. As a result, "slipperiness", "adhesion of stains" etc. can be prevented. This state can be maintained over a long term.

In an example of the present invention, the following were mixed with each other: 30 to 50% by weight of a mixture of tetrafunctional and trifunctional alkoxysilanes; 5 to 20% by weight of a silane coupling agent of an epoxy group; and colloidal silica superfine particles having an average particle size of 5 to 20 nm.

[Grinding Tests Using Diamond Grindstone]

Table 2 described below shows results of the glossiness value, the surface roughness and the finish of each sample that were obtained by grinding the sample, using the roughness of a diamond grindstone as a parameter. According to the results, the grinding with the diamond grindstone with a roughness of #5000 or more makes it possible to give a mirror surface glossiness with a surface roughness Rmax of 0.8 s or less and a mirror surface glossiness value of 80 or more. Thus, a finish is obtained which has an excellent mirror surface glossiness equivalent to that of, for example, normal ceramic tiles or granite.

TABLE 2

| Diamond grindstone | Glossiness value | Surface roughness (Rmax) | Finish |
|---|---|---|---|
| 1. #1500 | 62-68 | 2.0-2.7 | Weak gloss |
| 2. #3000 | 70-80 | 1.5-1.8 | Semi-mirror surface finish |

TABLE 2-continued

| Diamond grindstone | Glossiness value | Surface roughness (Rmax) | Finish |
|---|---|---|---|
| 3. #5000 | 80-85 | 0.8-1.0 | Mirror surface finish |
| 4. #8000 | 84-88 | 0.8 or less | Mirror surface finish |

<Test Method>

A coating film having a thickness of 20 to 30 μm and a hardness corresponding to 12H was formed on a glass plate, and a grinding test of the resultant sample was carried out.

With respect to grinding, each grindstone was fitted to a hand polisher, and then grinding was carried out for about one minute while water was applied.

A glossiness value was measured, using a handy glossmeter (IG-331, made by Horiba Ltd.), and surface roughness was measured, using a site-type surface roughness meter (SURFTEST SJ-2100.75 MN, made by Mitsutoyo Corp.). The glossiness value and the surface roughness of each sample were described as an average value of five points measured.

The above results demonstrate that grinding with a grindstone with a roughness of #5000 or more gives a surface roughness Rmax of 0.8 s or less and a mirror surface glossiness of 80 or more and thus a mirror surface finish generally called a mirror surface is obtained. For reference, as the grit number of a grindstone is made higher (for example, #8000 or #10000), the resultant is made better in glossiness value and surface roughness; however, the grindstone becomes lower in grinding ability so that a longer period is required to attain mirror surface finish. Thus, the use of a #5000 grindstone gives a good mirror surface state without spending much processing time.

[Peeling Tests Using Diamond Grindstone]

As shown in Table 3 below, coating films having hardness corresponding to 8H to 13H were formed, using tri- and tetra-functional silanes, a silane coupling agent, and colloidal silica as parameters. The coating films were each ground, using a #5000 grindstone to check whether or not the coating layer was peeled. The thickness of the coating layer was set to 20 μm. In the test, a glass plate relatively good in adhesiveness was subjected to the processing, and the resultant sample was evaluated in the state of not being affected by adhesiveness of the coating layer to a substrate.

TABLE 3

| | Test result | Judgement | Considerations |
|---|---|---|---|
| 8H | Peeled at a ratio of 5/5 Numerical grind-injuries | X | Generation of peels and grind-injuries by hardness shortage in grinding |
| 9H | Peeled at a ratio of 5/5 Numerical grind-injuries | X | Generation of peels and grind-injuries by hardness shortage in grinding |
| 10H | Peeled at a ratio of 2/5 Many grind-injuries | X | Generation of peels and grind-injuries by hardness shortage in grinding |
| Corresponding to 11H | Not peeled at a ratio of 0/5 Six grind-injuries | Δ | No generation of peels, but generation of grind-injuries |
| Corresponding to 12H | Not peeled at a ratio of 0/5 No grind-injuries | ○ | Good |
| Corresponding to 13H | Not peeled at a ratio of 0/5 No grind-injuries | ○ | Good |

<Test Method>

A glass plate surface was roughened with GC powder #1000, and the coating agents were each applied to the surface. The thickness was set to 20 μm.

A standard of JIS K 5600 scratch hardness test (based on a pencil method, and referred to as "pencil hardness test" hereinafter) has hardness up to 6H. However, there are actually pencils with harnesses up to 10H. Thus, the pencils were used to make the hardness measuring tests. Harnesses of 11H or more were presumed to be a value corresponding to 11H, 12H, and 13H respectively on the basis of correlative data between the pencil hardness test and the abrasion resistance test as shown in FIG. 1.

For the diamond grindstone grinding, #5000 grindstone was used. the sample was ground with a hand polisher for about one minute while water was applied thereto.

The test was done 5 times respectively to check whether or not a peel and/or a scratch invasion was generated.

A glass plate of 10 cm×10 cm size was used as a sample.

From the above test results, it has been understood that in a case where a coating film has a film thickness of about 20 μm, the coating film can be post-processed (ground with a diamond grindstone) without being peeled or scratched when the film has a hardness corresponding to 12H or more.

[Abrasion Resistance Test Results]

Table 4 described shows results of the abrasion resistance and the glossiness-maintaining performance of a coating film having a various pencil hardness of the coating agents. From the results, it is understood that a coating layer hardness of about 12H gives an abrasion resistance that is 10 to 20 times larger than that of marble 1 or 2, and gives an excellent glossiness.

TABLE 4

| Pencil hardness test (H) | Abrasion resistance test (mg/hour · cm$^2$) | Glossiness value |
|---|---|---|
| 1. Marble (Botticino) grinding only | 3.0 mg-4.5 mg | 57-63 |
| 2. Marble (Bianoco carrara) grinding only | 3.5 mg-5.0 mg | 55-60 |
| 3. 8H coating layer | 4.0 mg-5.0 mg | 60-68 |
| 4. 9H coating layer | 1.5 mg-2.5 mg | 68-73 |
| 5. 10H coating layer | 0.3 mg-0.6 mg | 70-75 |
| 6. 11H corresponding coating layer | 0.1 mg-0.3 mg | 74-77 |
| 7. 12H corresponding coating layer | 0.1 mg or less | 77-79 |

<Test Method>

For the measurement of hardness, JIS K5600 pencil hardness test was used. The layer thickness was set to 20 μm on the glass plate.

The standard of JIS K5600 pencil hardness test has hardness up to 6H. However, there are actually pencils with harnesses up to 10H. Thus, the pencils were used to make the hardness measuring tests. Harnesses of 11H or more were presumed to be a value corresponding to 11H, 12H, and 13H respectively on the basis of correlative data between the pencil hardness test and the abrasion resistance test as shown in FIG. 1.

The abrasion resistance test was measured according to JIS H8503-1989.

The abrasive agent used was GC #100.

The test was made after initial glossiness values of marble and the coating layer were unified to 80.

A period of one hour in the abrasion resistance test corresponds to one year in actual spots.

According to the above results, when the hardness of a coating layer becomes a value corresponding to 12H or more, the layer is remarkably improved in abrasion resistance and glossiness-maintaining performance, and thus a maintenance-free coating film can be formed. As a result, it has been verified that abrasion resistance and glossiness-maintaining performance 10 to 20 times larger than those of normal marble can be attained.

From the above results, it is understood that by setting the hardness of a coating layer to a value corresponding to 12H or more, the layer can attain a mirror surface finish without being peeled by the post processing (grinding with a diamond grindstone); and that the coating film becomes the one having a glossiness-maintaining performance 10 to 20 times larger than that obtained by grinding normal marble, to be able to be provided as a maintenance-free stone.

When a specification of the coating agent is decided, the proportion of the total amount of silanes was fixed to 40%. Verification was made about the finish, the adhesive state, the hardness etc., using a ratio between a tetrafunctional silane and a trifunctional silane as a parameter. Table 5 is according to evaluations made with the proportion of an epoxy functional group silane coupling agent fixed to 10% by weight, that of a phosphoric acid catalyst as a catalyst to 3% by weight and that of colloidal silica to 35% by weight respectively.

TABLE 5

| 40% Silanes (tetrafunctional silane/trifunctional silane) | Silane coupling agent (wt %) | Phosphoric acid (wt %) | Colloidal silica (wt %) |
|---|---|---|---|
| 1 "Tetra 0%"/"Tri 100%" | 10 | 3 | 35 |
| 2 "Tetra 5%"/"Tri 95%" | 10 | 3 | 35 |
| 3 "Tetra 10%"/"Tri 90%" | 10 | 3 | 35 |
| 4 "Tetra 15%"/"Tri 85%" | 10 | 3 | 35 |
| 5 "Tetra 20%"/"Tri 80%" | 10 | 3 | 35 |
| 6 "Tetra 25%"/"Tri 75%" | 10 | 3 | 35 |
| 7 "Tetra 30%"/"Tri 70%" | 10 | 3 | 35 |

As described above, while the proportion of the tetrafunctional silane in the 40% silanes was varied from 0 to 30%, the finish about, for example, a crack or peel, the adhesive state, the hardness etc. of the resultants were checked. The results were then judged. The judgements were shown in Table 6.

TABLE 6

| | Finish (as to whether or not coating film was cracked or peeled) | Adhesion test | Hardness | Judgement |
|---|---|---|---|---|
| 1 | Good finish | 100/100 | 10.5H | OK |
| 2 | Good finish | 100/100 | 11H | OK |
| 3 | Good finish | 100/100 | 12H | OK |
| 4 | Good finish | 100/100 | 13H | OK |
| 5 | Good finish | 100/100 | 14H | OK |
| 6* | Slightly cracked | 70/100 | 8H | NG |
| 7* | Cracked and peeled | 35/100 | 4H | NG |

Finish check: it was checked whether or not the sample was cracked or peeled through visual observation.

Adhesion test method: in accordance with a cross-cut adhesion method described in JIS K5400, a 1-cm$^2$ area of the coated surface of a test piece was cut into 100 squares having an area of 1 mm$^2$, and a cellophane adhesive tape was pressed thereon under pressure. The tape was then peeled therefrom. The sample was judged from the number of remaining squares out of the 100 squares.

Pencil hardness test: the test was according to JIS K-5600. A test piece was fixed on a horizontal stand to face its coated surface upward. A pencil was held by hand at an angle of about 45 degrees. While the pencil was pushed onto the coating film surface as strongly as possible in such a degree that its lead was not broken, the coating film was scratched with the pushed pencil over a length of about 1 cm at an even speed toward the front of the testing person. The hardness symbol of the hardest pencil not causing the coated surface to be broken, out of the used pencils, has been shown. It should be noted that the standard of JIS pencil hardness test has hardness up to 6H. However, there are actually pencils with harness up to 10H. Thus, these pencil hardnesses were used to make the tests. Hardnesses of 11H or more were presumed to be a value corresponding to 11H, 12H, and 13H on the basis of correlative data between the pencil hardness test and the abrasion resistance test as shown in FIG. 1.

According to the above results, samples Nos. 1 to 5 passed (OK). However, samples Nos. 6 and 7 were cracked or peeled so that the samples did not pass their adhesion test (NG). This is because as the proportion of the tetrafunctional silane is larger, the resultant coating layer becomes higher in hardness to get unstable in adhesiveness to the substrate, so that the layer is easily cracked or peeled. Thus, the ratio between the tetrafunctional silane and the trifunctional silane was fixed to 1/9, and the evaluating test described below was made. Table 7 described below shows results of the tests made using, as parameters, main alkoxysilanes, an epoxy functional group, catalysts, colloidal silica to form coating layers having a hardness corresponding to 12H or more.

(4) Pencil hardness, which was according to JIS K-5600. A test piece was fixed on a horizontal stand to face its coated surface upward. A pencil was held by hand at an angle of about 45 degrees. While the pencil was pushed onto the coating film surface as strongly as possible in such a degree that its lead was not broken, the coating film was scratched with the pushed pencil over a length of about 1 cm at an even speed toward the front of the testing person. The hardness

TABLE 7

| Sample No. | Main alkoxysilanes (tetra- & tri-functional silanes) (wt %) | Epoxy functional group silane coupling agent (wt %) | Catalyst(s) (wt %) | Colloidal silica (solvent-dispersed & aqueaous) (wt %) |
|---|---|---|---|---|
| 1 | Tetra- & tri-functional silanes: 55% | 3% (*) | Phosphoric acid: 1% | 40% |
| 2 | Tetra- & tri-functional silanes: 55% | 3% (*) | Phosphoric acid: 2% | 30% |
| 3 | Tetra- & tri-functional silanes: 50% | 3% (*) | Phosphoric acid: 3% | 40% |
| 4 | Tetra- & tri-functional silanes: 45% | 5% (*) | Phosphoric acid: 3% | 40% |
| 5 | Tetra- & tri-functional silanes: 45% | 5% (*) | Phosphoric acid: 5% | 40% |
| 6 | Tetra- & tri-functional silanes: 45% | 5% (*) | Ti based catalyst: 5% + Al based catalyst: 5% | 40% |
| 7 | Tetra- & tri-functional silanes: 40% | 10% (*) | Ti based catalyst: 10% + Al based catalyst: 10% | 40% |
| 8 | Tetra- & tri-functional silanes: 40% | 10% (*) | Phosphoric acid: 5% | 35% |
| 9 | Tetra- & tri-functional silanes: 40% | 10% (*) | Phosphoric acid: 3% | 35% |
| 10 | Tetra- & tri-functional silanes: 35% | 10% (*) | Phosphoric acid: 3% | 35% |
| 11 | Tetra- & tri-functional silanes: 35% | 10% (*) | Ti based catalyst: 5% + Al based catalyst: 10% | 35% |
| 12 | Tetra- & tri-functional silanes: 35% | 15% (*) | Phosphoric acid: 5% | 40% |
| 13 | Tetra- & tri-functional silanes: 35% | 10% | Phosphoric acid: 3% | 15% |
| 14 | Tetra- & tri-functional silanes: 30% | 10% | Phosphoric acid: 3% | 35% |
| 15 | Tetra- & tri-functional silanes: 30% | 10% | Phosphoric acid: 5% | 40% |
| 16 | Tetra- & tri-functional silanes: 30% | 10% | Phosphoric acid: 5% | 15% |
| 17 | Tetra- & tri-functional silanes: 25% | 10% | Ti based catalyst: 5% + Al based catalyst: 10% | 40% |
| 18 | Tetra- & tri-functional silanes: 25% | 15% | Phosphoric acid: 5% | 35% |

Symbol (*) shows that the corresponding value is out of the scope of the present invention.

Each of coating agents of sample-numbers 1 to 18 in Table 7 described above was applied onto marble, and then the resultant coating film was evaluated in accordance with methods described below. The results are shown in Table 8.
(1) Self-smoothness (viscosity; cSt (mm$^2$/s)), which was measured in accordance with a flow cup method in JIS K5600-2-2.
(2) Finger touch dry property (period), which was in accordance with JIS K5400. After applied onto marble surface, the center of the applied surface was lightly touched with a fingertip. A dry period has been shown which is a period until a coating film which did not stain the fingertip was formed after the application.
(3) Glossiness, which was in accordance with JIS K5400. A mirror surface glossiness meter was used to measure reflectivity when the incident angle and the reflection angle were each 60 degrees. The measured value has been shown as the percentage of the value relative to the glossiness of a standard surface for the mirror surface glossiness, which was regarded as 100.

symbol of the hardest pencil not causing the coated surface to be broken, out of the used pencils, has been shown. It should be noted that the standard of JIS pencil hardness test has hardness up to 6H. However, there are actually pencils with harness up to 10H. Thus, these pencil hardnesses were used to make the tests. Hardnesses of 11H or more were presumed to be a value corresponding to 11H, 12H, and 13H on the basis of correlative data between the pencil hardness test and the abrasion resistance test.
(5) Time-of-arrival to 12H: with respect to the abrasion resistance of 12H presumed from the above pencil hardness test and the abrasion resistance test, the measurement was made at an interval of 5 hours to check whether or not the hardness thereof arrived at a hardness corresponding to 12H.
(6) Coating thickness: the thickness of a test piece was measured with a micrometer or by a three-dimensional measuring machine before and after the coating agent was applied. The measurement was made after about one day elapsed from the application.
(7) Adhesiveness: in accordance with a cross-cut adhesion method described in JIS K5400, a 1-cm$^2$ area of the coated surface of a test piece was cut into 100 squares having an area of 1 mm², and a cellophane adhesive tape was pressed thereon under pressure. The tape was then peeled therefrom. The sample was judged from the number of remaining squares out of the 100 squares.

(8) Cracked or not cracked: the coating agent was applied onto a stone tile, and then the tile was left at an ambient temperature of 25° C. for about one week. It was then observed whether or not the surface of the stone tile was cracked.

TABLE 8

| Sample No. | Fluidity (viscosity); unit: cSt | Finger touch drying (minutes) | Glossiness | Pencil hardness (H) | Time-of-arrival to 12H | Coating thickness (μm) | Adhesiveness | Cracked or not |
|---|---|---|---|---|---|---|---|---|
| 1* | 7.5 | 50 | 90 | 13H or more | 5-7 days | 35 | 82/100(*) | Cracked |
| 2* | 7.0 | 40 | 88 | 13H or more | 2-3 days | 30 | 85/100(*) | Slightly cracked |
| 3* | 6.7 | 30 | 88 | 13H or more | 15 hours | 27 | 81/100(*) | Slightly cracked |
| 4 | 6.0 | 35 | 87 | 13H | 1 day | 27 | 100/100 | Good |
| 5 | 5.8 | 25 | 86 | 13H | 1 day | 25 | 100/100 | Good |
| 6* | 5.5 | 70 | 85 | 13H | 2 days | 25 | 100/100 | Good |
| 7 | 5.7 | 40 | 81 | 13H | 1 day | 27 | 100/100 | Good |
| 8 | 5.5 | 25 | 86 | 12H | 15 hours | 25 | 100/100 | Good |
| 9 | 5.1 | 35 | 88 | 12H | 20 hours | 25 | 100/100 | Good |
| 10 | 4.5 | 25 | 85 | 12H | 20 hours | 23 | 100/100 | Good |
| 11 | 4.0 | 50 | 83 | 12H | 1 day | 23 | 100/100 | Good |
| 12 | 4.5 | 40 | 88 | 12H | 15 hours | 33 | 100/100 | Good |
| 13* | 3.7 | 30 | 84 | 11H | Not arrived | 22 | 100/100 | Good |
| 14 | 3.7 | 30 | 84 | 12H | 20 hours | 25 | 100/100 | Good |
| 15 | 3.6 | 20 | 82 | 12H | 15 hours | 23 | 100/100 | Good |
| 16* | 3.2 | 20 | 80 | 11H | Not arrived | 21 | 100/100 | Good |
| 17* | 2.5 | 40 | 76 | 11H | Not arrived | 20 | 100/100 | Good |
| 18* | 3.0 | 25 | 83 | 10H | Not arrived | 27 | 100/100 | Good |

Symbol "*" shows that the corresponding value is out of the scope of the present invention.
Fluidity (viscosity) cSt (mm²/s)

As is understood from Table 8, samples Nos. 1 to 3 show too high hardness and cracking was observed. When the adhesiveness thereof is checked, each of the samples is partially peeled. Thus, it appears that the setting of the hardness is evidently too high. However, the results of the hardness measurements show low numerical values. This would be because the samples are internally strained or cracked so that the adhesiveness thereof to the substrate becomes unstable to show the low numerical values. As compared with those samples, the samples 4 to 6 are large in coating film thickness and have a high pencil hardness corresponding to 13H. However, the sample No. 6 requires 2 days for a rise-up of the hardening to a hardness corresponding to 12H or more; thus, this sample is outside the present invention. Furthermore, the samples Nos. 7 to 12, 14 and 15 gain a high hardness corresponding to 12H. In the meantime, the samples No. 13, and 16 to 18 seems to be short in hardness.

Experiment Example 2

According to the above test results, samples Nos. 4 to 15, which gained a hardness corresponding to 12H or more, were each actually ground with a #5000 diamond grindstone. Then, evaluations were made as to whether or not the sample was peeled or scratched, and about glossiness, surface roughness, slipperiness, and electrostatic property (surface resistance value). The results were shown in Table 9.

TABLE 9

| | Peel and Injuries | Glossiness | Surface roughness (Rmax) | Slipperiness Dry | Slipperiness Wet | Surface resistance value: X (10ˣ Ω) |
|---|---|---|---|---|---|---|
| 4 | None | 83-86 | 0.6 | 0.65 | 0.55 | 10.2 |
| 5 | None | 82-85 | 0.7 | 0.70 | 0.50 | 10.4 |

TABLE 9-continued

| | Peel and Injuries | Glossiness | Surface roughness (Rmax) | Slipperiness Dry | Slipperiness Wet | Surface resistance value: X (10ˣ Ω) |
|---|---|---|---|---|---|---|
| 6 | None | | | | | |
| 7 | None | 82-85 | 0.6 | 0.60 | 0.55 | 10.1 |
| 8 | None | 82-84 | 0.7 | 0.65 | 0.50 | 10.2 |
| 9 | None | 82-83 | 0.7 | 0.65 | 0.55 | 9.9 |
| 10 | None | 81-84 | 0.8 | 0.70 | 0.60 | 10.7 |
| 11 | None | 82-84 | 0.8 | 0.70 | 0.60 | 10.1 |
| 12 | None | 81-85 | 0.8 | 0.80 | 0.65 | 10.4 |
| 14 | None | 81-83 | 0.8 | 0.75 | 0.60 | 9.7 |
| 15 | None | 81-83 | 0.8 | 0.80 | 0.60 | 10.3 |

<Test Methods>

The slip resistance value was measured, using a slip tester in accordance with JIS A 1454 "Polymeric Flooring Material Test Method". Each sample was measured 5 times under conditions of a dry state, and a wet state with tap water. The average value thereof was used.

The surface resistance value was measured 5 times with respect to the sample allowed to stand still in a room for a half day or longer under warm and wet conditions of a temperature of 25° C. and a humidity of 50%, using a surface resistance value meter (YC-103). The average value thereof was used.

From the above-mentioned results, it has been understood that even for a floor material generally poor in water absorption coefficient and adhesiveness to various coating agents, such as marble, a coating agent specification as described above makes it possible to form a coating film which is excellent in adhesiveness and high in hardness, which is not peeled or scratched even when the film is ground with a diamond grindstone, and which has an excellent mirror surface glossiness. As a result, a maintenance-free stone can be produced which is made of marble, an artificial stone, terrazzo, or any other relatively soft floor material but has an excellent mirror surface glossiness and long-term glossiness-maintaining performance equivalent to those of ceramic tiles, granite and others.

In the present invention, a silane coupling agent is used which has an epoxy group relatively affinitive with calcium carbonate contained in stone in order to solve instability of adhesiveness. By the silane content by percentage and others, a coating agent is heightened in reactivity to gain a high adhesiveness to the surface of stone. Using tetrafunctional and trifunctional silanes and colloidal silica containing a silica having an average particle size of 5 to 20 nm, a rise-up of the hardening of the agent at ambient temperature is promoted so that the agent can be hardened into a hardness corresponding to 12H or more in a period from one hour to one day. Thus, the resultant stone can be ground in a period from about 1 hour to one day after the agent is applied. The application of a grinding processing gives a finish excellent in mirror surface glossiness. Thus, a maintenance-free stone tile is obtained which maintains high hardness, deep material feeling, antifouling property, waterproofness, abrasion resistance, transparency, and anti-cracking property over a very long term. It is generally mentioned about slip resistance coefficient values that CSR values of 0.4 or less are in a risky range. However, the slip properties of the tile can be set to 0.6 or more in a dry state and 0.5 or more in a wet state, these values being according to CSR value measurement, by finishing the surface to have a mirror surface having a surface roughness Rmax of 0.8 s or less, by blending the silica at a proportion from 20 to 40% by weight, by adding the relatively weak water-repellent epoxy functional group silane coupling agent, and by other technical means. Thus, the slipperiness is largely improved to restrain the generation of a falling accident and other accidents. Furthermore, with respect to the tetrafunctional and trifunctional silanes in the above-mentioned composition, by using the one having a molecular weight of 150 or less, permeability into stone is also improved and an anchor effect is expected as well. Thus, a highly adhesive coating film can be formed through chemical bonds and anchor effects caused by improvement of permeability into stone by use of the epoxy functional group silane coupling agent etc.

Furthermore, in the present invention, the surface of a stone tile is beforehand roughened with, for example, a #400 diamond grindstone to promote the anchor effect further. Thus, just a monolayer-finish can make it possible to provide a coating film with very high hardness and glossiness-maintaining performance. Moreover, being different from coating agents for chemical floors, the viscosity of the coating agent is lowered to have a value of 3 to 6 cSt (mm²/s) to improve fluidity. Thereby, levelling properties after coating are improved, a reduction of mirror surface degree is prevented, and the coating agent can penetrate into the inside of even marble, which is relatively low in water absorption coefficient, so that adhesiveness to the surface of the stone can be improved. Furthermore, by grinding the coating film surface of the above composition after about one hour to one day from the coating to have a mirror surface glossiness of 80% or more, a surface roughness Rmax of 0.8 s or less as well as a mirror surface glossiness of 80 or more can be attained, and a long-term glossiness-maintaining performance that is about 10 to 20 times compared to that of ordinary stone surface is attained, so that a maintenance-free stone tile keeping a deep material feeling over a very long term can be obtained.

Effects of the Invention

In this invention, a super hard glassy coating film having a pencil hardness corresponding to 12H or more, preferably of 12 to 15H is formed on the surface of a stone tile, such as a marble, artificial stone, terrazzo or ceramic tile. Then, such a stone tile as can be finished to have a surface roughness Rmax of 0.8 s or less and a mirror surface glossiness of 80 or more by grinding with a diamond grindstone as a post processing in a period of about one hour to one day can be produced. As a result, a maintenance-free stone tile can be provided which has an extremely excellent glossiness-maintaining performance that is about 10 to 20 times compared to that obtained in the case of general grindings. Furthermore, a maintenance-free stone tile can be provided which can gain a coating film that is improved in slipperiness to avoid risks of a falling accident and others, and that is good in water resistance, antifouling property, adhesiveness and electrostatic property, and no generation of cracks.

Additionally, in this invention, prepared is a material design specification using tetrafunctional and trifunctional silanes, an epoxy functional group silane coupling agent, and a silica sol having an average particle size of 5 to 20 nm in order to obtain a super hard inorganic glassy coating agent with a hardness corresponding to 12H or more. In order to gain this hardness corresponding to 12H or more in a period from one hour to one day, a catalyst is reconsidered to decide to use phosphoric acid, or a titanium based catalyst and/or aluminum catalyst, which is/are high in reaction hardenability, and to select silanes suitable for the catalyst(s) to give a rise-up of the hardening to a hardness corresponding to 12H or more in a short period. Lastly, in order to solve instability of adhesiveness, the specification is modified into a specification in which a silane coupling agent having an epoxy functional group, which is relatively affinitive with calcium carbonate as a component of stone, is incorporated, and further in which about the silanes of the above composition, silanes smaller in molecular weight than the silane coupling agent are used. In these ways, permeability into stone is heightened, and highly adhesive states can be produced through anchor effects. In other words, a state highly adhesive to marble can be attained through double adhesions caused by chemical bonds based on the epoxy functional group silane coupling agent and a heightened anchor effect (physical adhesion) based on permeability into stone which is heightened by use of the small-molecular-weight silane. As a result, a highly hard coating film having a hardness corresponding to 12H or more can be obtained in about one hour to one day after the application of the coating agent, so that a grinding processing with a diamond grindstone as a post processing becomes possible to attain a finish having a surface roughness Rmax of 0.8 s or less and a mirror surface glossiness of 80 or more. In this way, a coating agent for a maintenance-free stone tile is obtainable which has a very good glossiness-maintaining performance that is 10 to 20 times compared to that obtained by general grinding, which can attain mirror surface glossiness, deep mater feeling, antifouling property, waterproofness, abrasion resistance, transparency, water resistance, acid resistance, alkali resistance, oil resistance and others, which can be prevented from undergoing cracks and other defects, and which can keep glossiness over a long term. It is generally mentioned about slip resistance coefficient values that CSR values of 0.4 or less are in a risky range. However, by making a finish having a high mirror surface degree as described above, by adding the colloidal silica in a proportion of 20 to 40% by weight, by using the silane coupling agent of a relatively weakly water-repellent epoxy functional group, and by other technical means, a super hard maintenance-free coating agent for stone tiles can be obtained in which a slip properties of 0.6 or more in a dry state and 0.5 or more in a wet state can be attained, these values being each according to CSR value measurement, and the slipperiness can be largely improved to restrain the generation of a falling accident and other accidents.

Furthermore, in this invention, the surface of a stone is beforehand roughened by diamond grinding, thereby making it possible to heighten permeability into the stone to form a highly adhesive coating film. Since the coating agent is adjusted in viscosity to have a value of 3 to 6 cSt (mm$^2$/s), the agent can be improved in fluidity, thereby being improved in levelling property after application. The improvement makes it possible to form a coating layer having a mirror surface degree that is, to some degree, high even when no post processing is conducted, and further to permeate the coating agent into marble relatively low in water absorption coefficient so that the layer can gain a high adhesiveness to the stone itself. Furthermore, by grinding the coating film surface of the above-mentioned composition in about one hour to one day after coating to have a surface roughness Rmax of 0.8 s or less and a mirror surface glossiness of 80 or more, the surface can be modified to a mirror surface state. This makes it possible to provide a method for producing a maintenance-free stone tile which is excellent in mirror surface glossiness, which can keep a very good glossiness-maintaining performance that is about 10 to 20 times compared to that of general stone surface, and which can maintain high hardness, deep material feeling, antifouling property, waterproofness, abrasion resistance, transparency, cracking resistance, and slip resistance over a very long term.

What is claimed is:

1. A maintenance-free stone tile, comprising:
   a stone tile selected from the group consisting of marble and terrazzo; and
   an inorganic glassy protective coating layer formed on a surface of the stone tile,
   wherein the inorganic glassy protective coating layer has an outer surface having a pencil hardness of a value corresponding to 12H or more in the case of measuring the outer surface on the basis of correlative data between a pencil hardness test and an abrasion resistance test; a thickness of the coating of 20 to 50 µm; a surface roughness Rmax of 0.8 s (µm) or less; a mirror surface glossiness of 80 or more; dry slip properties of 0.6 or more; a wet slipperiness of 0.5 or more; and a surface resistance value of $10^{11}$Ω or less,
   wherein the inorganic glassy protective coating layer is formed of an inorganic glassy coating agent, and
   wherein the inorganic glassy coating agent comprises a main ingredient which comprises:
   an alkoxysilane essentially consisting of a mixture of a tetrafunctional alkoxysilane and a trifunctional alkoxysilane at a ratio of tetrafunctional silane 10%/trifunctional silane 90% to tetrafunctional silane 20%/trifunctional silane 80%,
   a silane coupling agent that has an epoxy functional group; and colloidal silica superfine particles having an average particle size of 5 to 20 nm;
   wherein provided that the proportion of the main ingredient being regarded as 100% by weight,
   the alkoxysilane is from 30 to 50% by weight;
   the silane coupling agent is from 5 to 20% by weight;
   the colloidal silica superfine particles are from 20 to 40% by weight; and
   phosphoric acid is in the range from 0.1 to 5.0% by weight or
   a titanium based catalyst and/or an aluminum based catalyst is in the range from 0.1 to 20.0% by weight, added as a catalyst for heightening reaction hardenability,
   wherein the inorganic glassy coating agent has a viscosity of 3.6 cSt to 6 cSt (mm$^2$/s), and
   wherein the inorganic glassy coating agent provides an outer surface having a pencil hardness of a value corresponding to 12H or more in the case of measuring the outer surface on the basis of correlative data between a pencil hardness test and an abrasion resistance test.

2. An inorganic glassy coating agent for a maintenance-free stone tile, comprising a main ingredient which comprises:
   an alkoxysilane essentially consisting of a mixture of a tetrafunctional alkoxysilane and a trifunctional alkoxysilane at a ratio of tetrafunctional silane 10%/trifunctional silane 90% to tetrafunctional silane 20%/trifunctional silane 80%,
   a silane coupling agent that has an epoxy functional group; and colloidal silica superfine particles having an average particle size of 5 to 20 nm;
   wherein provided that the proportion of the main ingredient being regarded as 100% by weight,
   the alkoxysilane is from 30 to 50% by weight;
   the silane coupling agent is from 5 to 20% by weight;
   the colloidal silica superfine particles are from 20 to 40% by weight; and
   phosphoric acid is in the range from 0.1 to 5.0% by weight or
   a titanium based catalyst and/or an aluminum based catalyst is in the range from 0.1 to 20.0% by weight, added as a catalyst for heightening reaction hardenability,
   wherein the inorganic glassy coating agent has a viscosity of 3.6 cSt to 6 cSt (mm$^2$/s),
   wherein the inorganic glassy coating agent provides an outer surface having a pencil hardness of a value corresponding to 12H or more in the case of measuring the outer surface on the basis of correlative data between a pencil hardness test and an abrasion resistance test, and
   wherein the inorganic glassy coating agent for a maintenance-free stone tile is to be applied to a stone tile selected from the group consisting of marble and terrazzo.

3. A method for producing a maintenance-free stone tile, comprising:
   a step of adjusting a viscosity of the inorganic glassy coating agent of claim 2 to 3.6 cSt to 6 cSt (mm$^2$/s), and then coating a floor surface of a stone that is obtained by roughening a surface of the stone beforehand by diamond grinding, the stone being selected from the group consisting of marble and terrazzo,
   a step of hardening the coating agent at ambient temperature in one hour to one day after the coating treatment to have a pencil hardness corresponding to 12H or more when the pencil hardness is measured on the basis of correlative data between a pencil hardness test and an abrasion resistance test; and a subsequent step of grinding the outer surface of the resultant coating layer with a diamond grindstone, whereby the resultant outer surface has a surface roughness Rmax of 0.8 s or less and a mirror surface glossiness of 80 or more.

\* \* \* \* \*